Nov. 21, 1944.     L. L. BOSCH     2,362,971
VEHICULAR SPEED RESPONSIVE DEVICE
Filed June 4, 1941     5 Sheets-Sheet 1
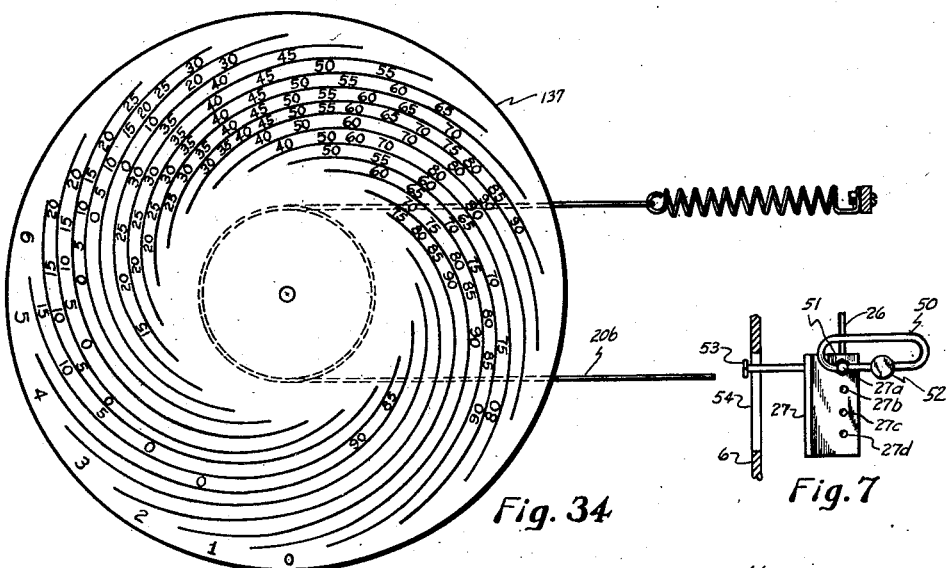
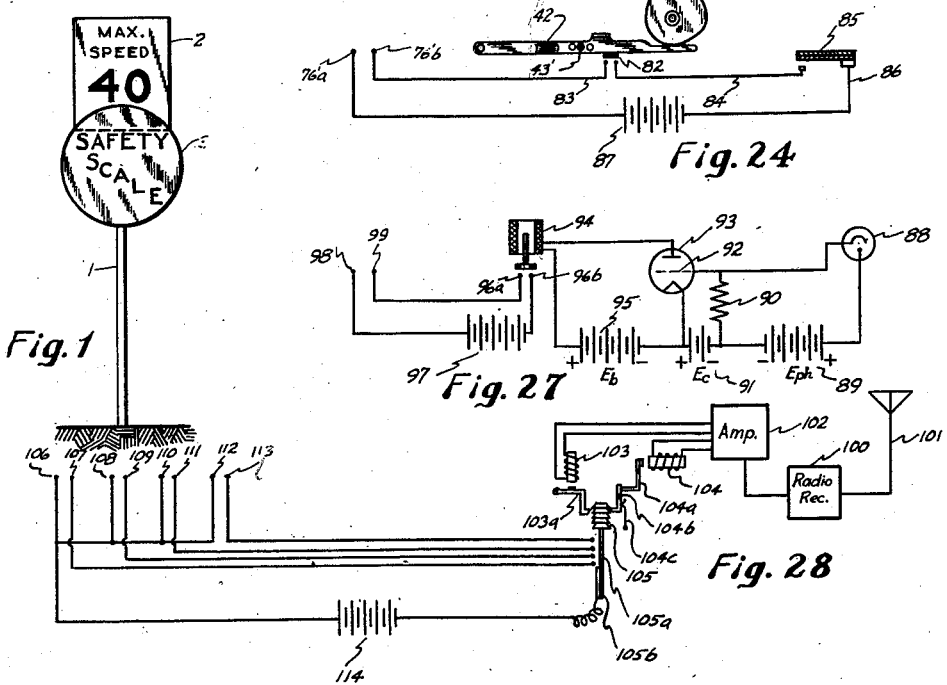
INVENTOR.
BY Lester L. Bosch
Bogert & Bogert Nov. 21, 1944. L. L. BOSCH 2,362,971
VEHICULAR SPEED RESPONSIVE DEVICE
Filed June 4, 1941 5 Sheets-Sheet 2
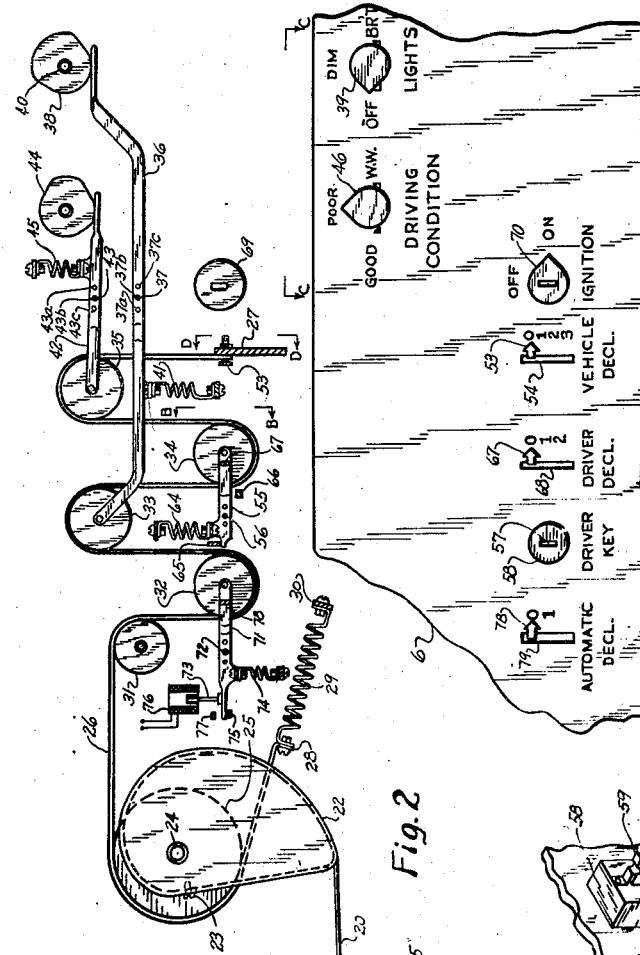
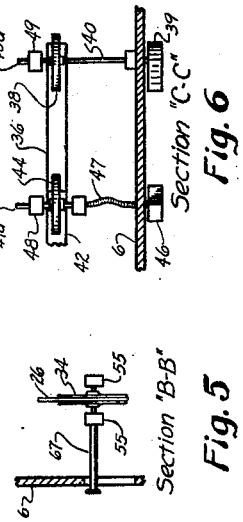
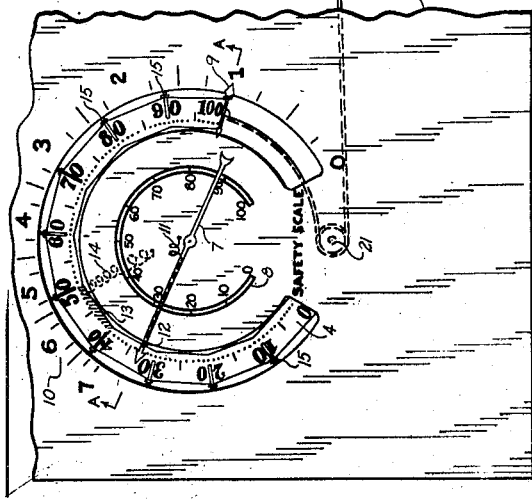
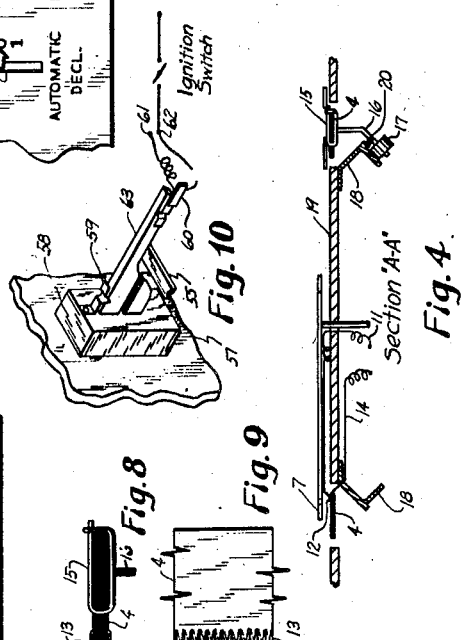
INVENTOR.
Lester L. Bosch
BY Bogert & Bogert Nov. 21, 1944.     L. L. BOSCH     2,362,971
VEHICULAR SPEED RESPONSIVE DEVICE
Filed June 4, 1941     5 Sheets-Sheet 3
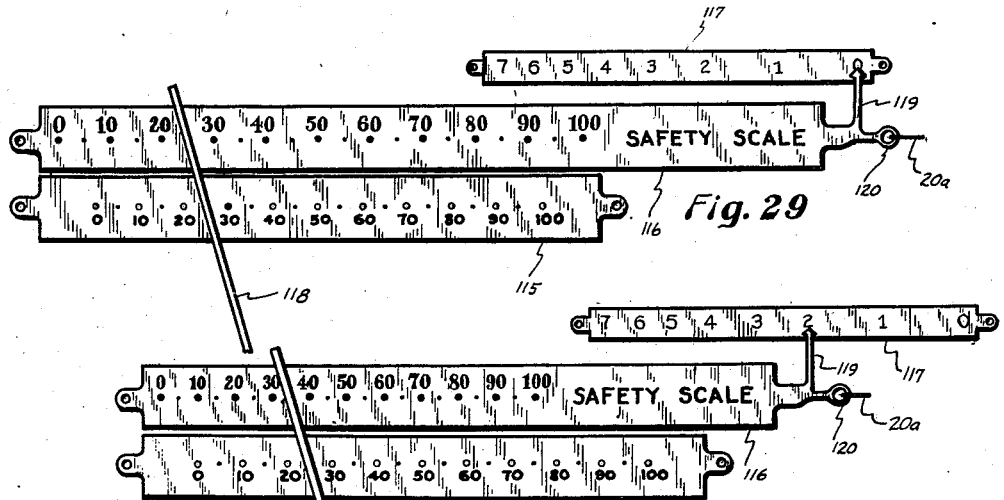
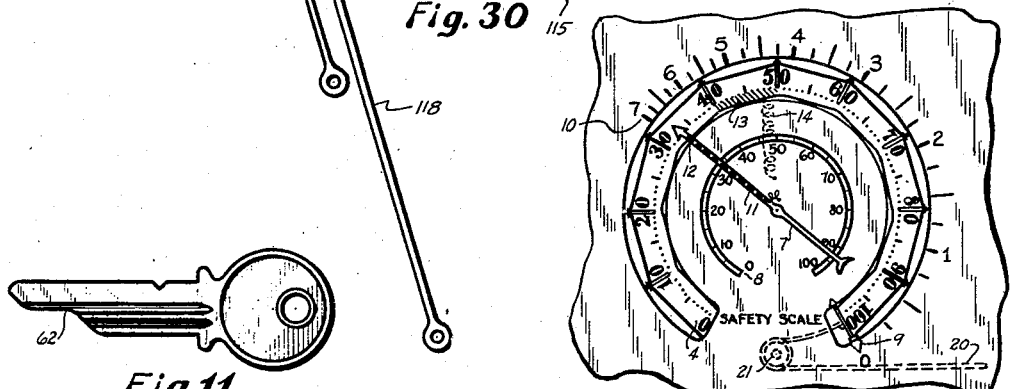
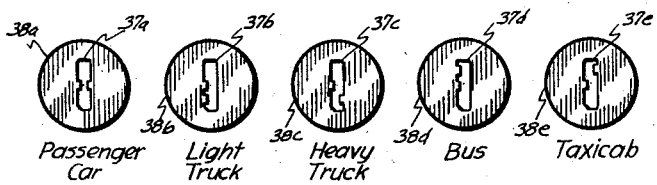
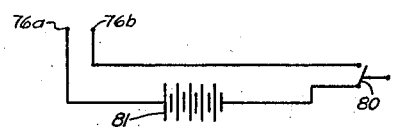
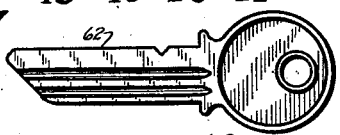
INVENTOR.
BY Lester L. Bosch
Bogert & Bogert

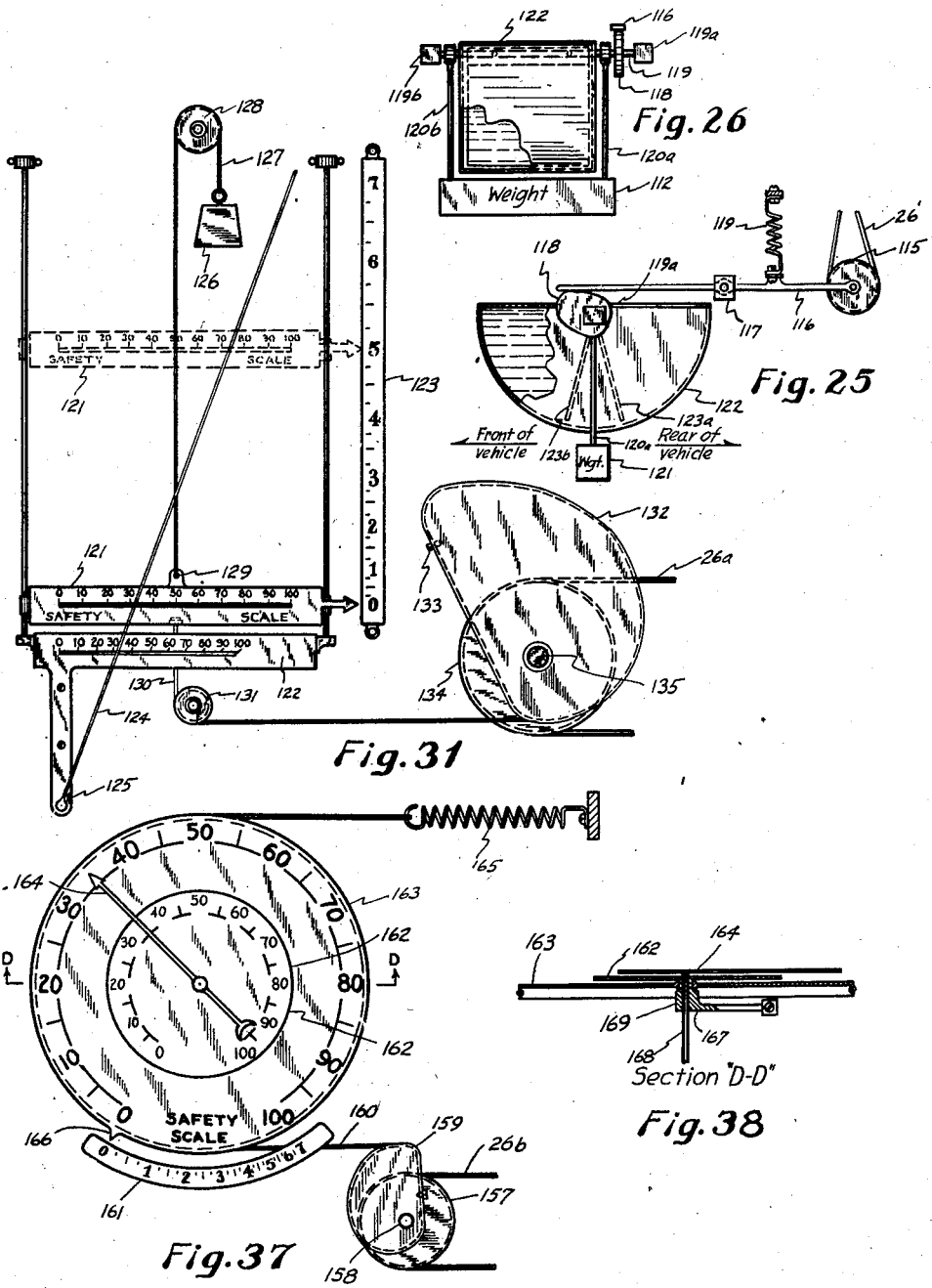

Nov. 21, 1944.   L. L. BOSCH   2,362,971
VEHICULAR SPEED RESPONSIVE DEVICE
Filed June 4, 1941   5 Sheets-Sheet 5

Section "F-F"

Section "E-E"

INVENTOR.
BY Lester L. Bosch
Bogert & Bogert

Patented Nov. 21, 1944

2,362,971

UNITED STATES PATENT OFFICE 2,362,971

VEHICULAR SPEED RESPONSIVE DEVICE

Lester L. Bosch, Cincinnati, Ohio

Application June 4, 1941, Serial No. 396,604

5 Claims. (Cl. 177—311.5)

It is the purpose of this application to disclose mechanism which will facilitate the application of the traffic safety method disclosed in application No. 382,046 and Patent No. 2,284,633 to speed responsive means of any type. This application does not include a consideration of speed responsive elements but does consider at length the scale pointer relationship of speed responsive means in which the object of declassification is obtained.

Another object of this application is to disclose automatic means for the declassification of vehicle units.

Still another object of this application is to show a further development in the classification of vehicle operators and development in means in which declassification of vehicle units is accomplished. This application does not include the display of signals concerning the vehicle's operation, but does include examples in which are shown electrical contacts suitable for the giving of signals, producing of records, or initiating of control sequences.

These and other objects of my invention will become apparent, to those versed in the art, in the following description of the accompanying drawings which constitute a counterpart of the invention, in which Fig. 1 is a roadside speed zone marker.

Fig. 2 is a front elevation of the speed responsive means section of a vehicle panel, including a front elevation of the mechanism immediately in the rear of Fig. 3.

Fig. 3 is a front elevation of a part of the vehicle's operating panel.

Fig. 4 is a section AA thru the speed responsive means shown in Fig. 2.

Fig. 5 is a section BB of Fig. 2.

Fig. 6 is a cross section CC of Fig. 3.

Fig. 7 is a detail of the vehicle classification means shown in section DD of Fig. 2.

Fig. 8 is an enlarged cross section which shows a commutator inserted in the elastic dial of the speed responsive means shown in Fig. 2.

Fig. 9 is an enlarged plan view of a commutator section.

Fig. 10 is a detail showing a driver's classification key in position.

Fig. 11 is a detail of the best grade operator's classification key.

Fig. 12 is a detail of a double declassified operator's key.

Fig. 13 is a cross section of a passenger car operator's classification key receiver.

Fig. 14 is a cross section of a light truck operator's classification key receiver.

Fig. 15 is a cross section of a heavy truck operator's classification key receiver.

Fig. 16 is a cross section of a bus operator's classification key receiver.

Fig. 17 is a cross section of a taxicab operator's classification key receiver.

Fig. 18 is a cross section of a key of an operator qualified to drive a passenger car.

Fig. 19 is a cross section of a key of an operator qualified to drive a passenger car and a light truck.

Fig. 20 is a cross section of a key of an operator qualified to drive a heavy truck.

Fig. 21 is a cross section of a key of an operator qualified to drive a light truck, heavy truck, and a passenger car.

Fig. 22 is a front view (in the undeclassified position) of the speed responsive means shown in Fig. 2.

Fig. 23 is a wiring diagram for energizing solenoid shown in Fig. 2.

Fig. 24 is a wiring diagram showing a method for declassifying the vehicle by use of a thermostat.

Fig. 25 is a cross section of a weighted dashpot showing an example of the classification of vehicle according to the grade on which it is traveling.

Fig. 26 is a front view of Fig. 25.

Fig. 27 is a wiring diagram showing a means of the automatic declassification of a vehicle by the use of a photoelectric cell.

Fig. 28 is a wiring diagram showing a means of setting the vehicle's declassification means by radio signals.

Fig. 29 is an example of a straight line elastic scale.

Fig. 30 is a view showing the elastic scale of Fig. 29 is a position of two declassifications.

Fig. 31 is an example of a horizontal scale which can be positioned in various vertical positions to obtain the desired declassification.

Fig. 34 is a movable target behind Fig. 32.

Fig. 37 is a front elevation of a scale of a speed responsive means in which the declassification is a fixed number of miles per hour at all speeds.

Fig. 38 is a cross section DD of Fig. 37.

Figure 32:
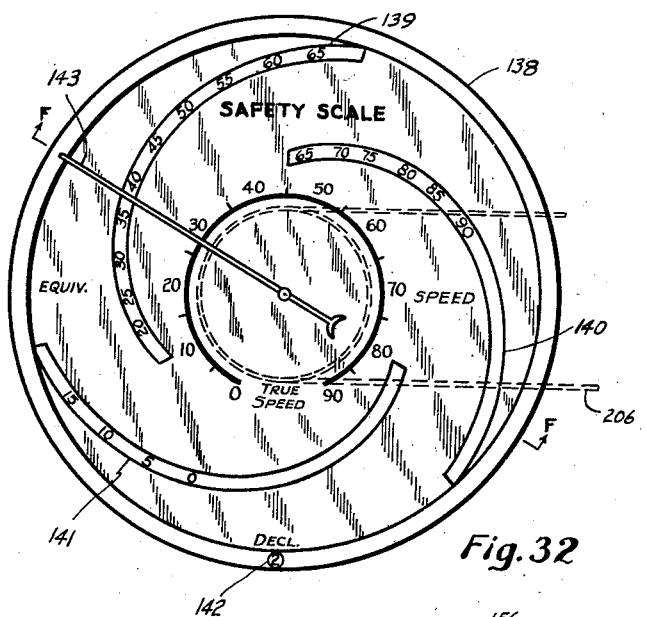
Fig. 32 is a front view of a speed responsive means scale in which declassification is obtained by masking.

This application will be described by considering first Fig. 1 to Fig. 28 inclusive.

Fig. 1 is a roadside speed marker in which 1 is a structural supporting member and 2 is a marker attached to structural member 1 showing the speed permissible in the particular zone over which the marker has jurisdiction. Also attached to structural member 1 is a second marker 3 which indicates that the maximum speed designated by element 2 is in terms of a special scale (marked "Safety scale") instead of in terms of the usual scale in miles per hour.

An example of one type of such a scale is shown by 4 in Fig. 2. This scale is shown mounted on a section of the vehicle instrument panel 5. Another section 6 of the vehicle instrument panel is shown in Fig. 3. Behind panel section 5 is mounted the speed responsive instrument which is responsive to the vehicle's true speed. Pointer 7 of this instrument indicates the true speed of the vehicle on scale 8.

Safety scale 4 differs from the true scale 8 in that it is not fixed but is elastic and can be stretched or allowed to contract. When the safety scale 4 is stretched to its maximum position as shown in Fig. 22 then the relative positions of its marking correspond to those of the true scale 8 and both scales indicate the true rate of speed of the vehicle (scale in miles per hour shown). This condition obtains for a vehicle unit of no declassifications and is so indicated by indicator 9 attached to the end of elastic scale 4 opposite "0" of the declassification scale 10. In Fig. 2, indicator 9 is opposite "1" on the declassification scale 10, indicating a vehicle unit of one declassification. All markings on safety scale 4 are contracted in proportion. As shown in this particular example, the indication on scale 4 by pointer 7 is .85 of that shown on scale 8. Moving indicator 9 to numeral "2" on declassification scale 10 would allow the elastic scale 4 to further contract and give an indication of .85×.85 or .721 of fixed scale 8. By the same process it is evident that positioning of indicator 9 at any given point on scale 10 would give a reading at all points on scale 4 in some fixed proportion to that of scale 8. The reciprocal of this proportion is shown on true scale 8 by the small inside arrow of indicator 9 attached to the end of safety scale 4. Conversely, this same indication indicates the reduction in true speed required to maintain a given declassified speed. Electrical lead wire 11 insulated and carried by pointer 7 makes contact thru sliding brush 12 to commutator 13 embedded in elastic scale 4. Only one section of commutator 13 is shown in Figs. 2 and 22. This section is between characters 40 and 50 on scale 4 and is connected to return lead 14 for the completing of any desired electrical circuit. It is obvious that as many commutator sections as desired could be employed similarly and that the type of commutator shown is purely exemplary. Such circuits could be used for the giving of signals, making records, control of vehicle in part or in whole, or for any other purpose.

Elastic scale 4 may be held in a circular position by members 15 supported by brackets 16 guided by contact member 17 in guide rack 18. Guide rack 18 is held in a fixed position attached to plate 19 on which scale 8 is stenciled. An enlarged cross section view of the elastic scale 4 is shown in Fig. 8 and an enlarged plan view in Fig. 9.

The position of this elastic scale is determined by a nonelastic tape 20 fastened to indicator 9. This tape fits in guide 18 and over pulley 21. Its other end fits over the face of cam 22 and is attached to the cam by lock screw 23. The shape of cam 22 is such that succeeding equal angular movements unwind progressively smaller sections of tape 20 and in turn cause progressively smaller contraction of elastic scale 4. In this particular example the shape of cam 22 is such that successive unit declassifications of the safety scale 4 causes equal percentage changes between the relationship of safety scale 4 and true scale 8.

Cam 22 is fixed to shaft 24. Shaft 24 in turn is fixed to cylinder 25 over which a second nonelastic tape 26 passes. The upper section of this tape 26 passes over a series of fixed and adjustable rollers and ends at one of four established positions in block 27. The lower section of tape 26 is connected by coupling 28 to a spring 29. Spring 29, in turn, is fixed at point 30 and adjusted such that adequate tension is always placed on tape 26 to faithfully impart any change in position to pulley 25 and therefore in turn to cam 22 and elastic scale 4. In this particular example tape 26 passes over one fixed-axis roller 31 and four adjustable position rollers 32, 33, 34 and 35. Roller 31 simply serves the purpose of changing the direction of the tape by 90°. The other four rollers are pivoted to adjustable members in such a manner that tape 26 is caused to move cylinder 25 corresponding to each new position of any adjustable member. The position of each adjustable member is determined by the respective control lever of the vehicle or special device with which it is associated. Roller 33, for instance, is positioned by lever 36 moving about pin 37 as a fulcrum. The end of lever 36 rides on the face of cam 38 associated with the head light control knob 39. In the position shown in Fig. 3 control knob 39 is in the off position. A 90° clockwise turn of this control lever would turn on the "dim" lights and a 180° clockwise turn, the "bright" lights.

Both cam 38 and control knob 39 are fastened to light switch shaft 40. Examination of cam 38 will show that when light switch 39 is moved to either the dim or bright position the right hand end of lever 36 will be forced downward and the left hand end holding roller 33 forced upward by an amount depending upon the length of the left and right hand moment arms of lever 36 and the increased radius of the contact point of cam 38. The lever arms may be adjusted to suit various local or regional laws by locating pin 37 in hole 37a, 37b or 37c. The end of lever 36 is maintained in contact with the face of cam 38 by tension spring 41 acting in combination with the tension on tape 26 by spring 29.

By the means just described it is evident that when the lights of the vehicle are turned "on" the "safety scale" 4 of the speed responsive means contracts and indicates a speed in excess of that shown on true scale 8. It is also apparent that if the "safety scale" is the designated scale to be used in the operation of the vehicle then when the lights of the vehicle are turned "on" a lower maximum true speed is established in any highway speed zone. If, before the lights were turned "on," the vehicle happened to have been traveling at the maximum speed allowed in a particular zone, then the speed would have to be reduced when the lights were turned on if infraction of the law were to be avoided.

In a similar manner to that just described other controls and devices derate the vehicle in the matter of allowable speeds. Roller 35, for instance, is positioned by lever 42, pivoted at pin 43 and riding on the face of cam 44. The lever arm lengths are determined by locating pin 43 in hole 43a, 43b or 43c and lever 42 is held in contact with cam 44 by tension spring 45. Cam 44 is connected to driving condition control knob 46 thru flexible shaft 47. Driving condition control knob 46 may be set in either the "good," "poor," or "WW" position. The "good" position corresponds to normal good driving conditions. In this position cam 44 has its minimum radius, in turn positioning roller 35 to its uppermost position.

The "poor" position corresponds to poor driving conditions as may be encountered by a wet street pavement. In this position cam 44 moves roller 35 downward declassifying the vehicle. Fig. 22 shows the safety scale before this declassification, and Fig. 2 shows it after. When the driving condition knob 46 is turned to the "WW" position, the windshield wiper is placed in service and at the same time cam 44 makes an additional 90° clockwise turn. The radius of the cam in this new position then determines the effect on the declassification of the vehicle. In this example cam 44 is shown with a larger radius in the "WW" position than in the "poor" position, thus establishing a greater declassification for a condition which requires the use of the windshield wiper than that corresponding to a wet pavement. However, it is not presumed that all authorities would want to establish a greater declassification for the "WW" position than for the "poor." Probably most of them would wish to establish the same magnitude of declassification for each position, in which case cam 44 would have the same radius for both positions.

In Fig. 6 is shown a section CC of the "lights" and "driving condition" control devices. It will be noted in this figure that shaft 47 extends on thru bearing 48 to shaft 47a which in turn is connected to control the operation of the windshield wiper. In a like manner shaft 40 extends on thru bearing 49 to shaft 40a which in turn connects to an electrical switch controlling the vehicle's lights.

The vehicle's classification is set by locating the end of tape 26 in the proper hole in block 27. Section "DD" of this block is shown by Fig. 7. In Fig. 7, as well as in Fig. 2, bolt 52 is shown inserted in hole 27a which corresponds to the best vehicle classification "0", that is, no declassification. It is presumed that the tape 26 would be sealed in the proper hole by legally constituted authorities or would be sealed by others according to some accepted vehicle classification. A simple wire seal 50 is shown in Fig. 7 sealing nut 51 on bolt 52 holding the end of tape 26. Indicator 53 is connected to this locked assembly and extends thru slot 54 in panel 6 to show the vehicle's declassification on the face of panel 6 as indicated by the "0" in Fig. 3.

The position of roller 34 is established by lever 55 pivoted at pin 56. Lever 55 in turn is positioned by the height of the driver's classification key inserted thru slot 57 of key receiver 58 fastened to panel 6. An isometric view of a driver's key in receiver 58 is shown in Fig. 10 and a detailed discussion of the construction of slot 57 is included later. Spring clip 59 serves to hold the key in position and contact 60 completes the ignition circuit 61 to 62. The height of the driver's key at point 63 determines the position of lever 55. Spring 64 acting in tension holds lever 55 against key 65. Stop 66 serves to limit the movement of lever 55 so as to allow the respective driver's keys to be inserted and position roller 34. Stop 66 is located so as to position roller 34 in the double declassified position. The insertion of a double declassified driver's key would then not change the position of roller 34 but would complete section 61—62 of the ignition circuit.

A double declassified operator's key is shown in Fig. 11. Fig. 12 shows a key of zero declassification. A single declassification key would have a height at point 62 intermediate between that shown by Fig. 11 and Fig. 12. It is apparent from Fig. 10 that it is necessary that a driver's key must be in position before the ignition circuit can be completed. Indicator 67 is fastened to lever 55 and extends thru slot 68 of panel 6 to show driver declassification on the face of panel 6 as in Fig. 3. A side elevation of this indicator is shown by section "BB" of Fig. 2 in Fig. 5 Ignition lock cylinder 69 is shown in Fig. 2 and panel indicator 70 in Fig. 3.

The position of roller 32 is determined by lever 71 pivoted at 72 and acted upon by solenoid rod 73. Spring 74 holds lever 71 against stop 75 when coil 76 is deenergized. When the solenoid is energized rod 73 is drawn into the coil and pulls lever 71 against stop 77 declassifying the vehicle. Indicator 78 connected to lever 71 extending thru slot 79 indicates on panel 6 the condition of this additional device which I have termed the "automatic declassifier."

In this, coil 76 is connected in the circuit shown in Fig. 23 in such a manner that when a trailer is attached to the vehicle, switch 80 completes the circuit of battery 81 and energizes the solenoid. Leads 76a and 76b are connected to the terminals of solenoid 76.

It is apparent that several such automatic declassifiers could be used each similar to that shown in Fig. 2. The wiring diagram in Fig. 24 shows an example for the use of a second solenoid declassifier. In this diagram, cam 44a represents a driving condition cam and lever 42', pivoted at 43', an associated lever, all functioning as in Fig. 2. Lever 42' differs from lever 42 by the addition of an interlock contact 82 which completes a circuit between leads 83 and 84 whenever the windshield wiper is turned on or a "poor" driving condition is recognized. The closing of this circuit together with the closing of the circuit across device 85 would place the potential of battery 87 across the solenoid terminals 76'a and 76'b and cause a further declassification. Device 85 is a thermostatic element located and adjusted so as to close its contacts whenever atmospheric temperature corresponded to the freezing of water. This would therefore establish an extra declassification whenever there was a liklihood of ice forming on the highway surface.

Still another way in which a solenoid, similar to element 76 in Fig. 2 may be used is shown in Fig. 27. This figure is a diagram of a photoelectric cell, amplifier tube and relay connected so that whenever the intensity of light falls below a predetermined level the vehicle is declassified automatically. This method of declassification may be employed in substitution for that established manually in Fig. 2 by the moving of light switch control knob 39. In Fig. 27, photoelectric cell 88 passes current from battery 89 in proportion to the light falling upon it. This current circulated in the circuit completed by resistor 90 and the voltage drop across resistor 90 is in proportion to the light falling upon photoelectric cell 88. The voltage drop across resistor 90 less the bias voltage of battery 91 is impressed upon grid 92 of amplifier tube 93. The plate circuit of tube 93 is completed thru relay 94 and battery 95. As long as sufficient light falls upon cell 88 then relay 94 is energized and its contacts 96a and 96b are unbridged. When sufficient light does not fall upon cell 88 then relay 94 is deenergized and the potential of battery 97 is placed across terminals 98 and 99, in turn energizing the declassification solenoid connected thereto.

In consideration of the automatic declassification of vehicle units it is of course obvious that the vehicles may be declassified remotely by policing authorities. An example of such an arrangement is shown in Fig. 28 which includes a radio receiving set and associated antenna 101 for receiving the signals. An amplifier 102 supplies power to a declassification releasing relay 104 and a declassifying relay 103. When relay 104 is energized it turns pivoted armature 104a clockwise bringing pawl 104b out of engagement with ratchet 105 allowing rod 105a to drop to the limit of its travel as shown in Fig. 28. When relay 104 is deenergized spring 104c holds pawl 104b in contact with ratchet 105. Assuming the equipment in the position shown in Fig. 28, each time relay 103 is energized armature 103a will be raised, in turn raising ratchet 105 one tooth. If, for instance, relay 103 is energized three times in succession then the ratchet 105 and its rod 105a would be lifted a distance corresponding to three teeth of the ratchet 105. Ratchet rod 105a could be connected directly to one of the rollers over which the tape 26 of Fig. 2 passes and therefore declassify the vehicle directly or a commutator 105b could be attached to rod 105 which in turn would energize solenoid for declassifying the vehicle in the manner as previously described. In Fig. 28 as the commutator 105b is raised potential of battery 114 cumulatively appears across terminals 106 and 107, 108 and 109, 110 and 111, thru 112 and 113. The remote setting of the declassification could of course be superimposed upon the peculiar declassification of each vehicle. This remote declassification might be employed to handle such conditions as unusually heavy traffic requiring slow speed, wet pavements, icy pavements, darkness, rain, fog, etc.

Another factor affecting the safety of driving and applicable to the declassification method described in application is that of the need for traveling at reduced speeds when going down hill, since the effect of gravity does not permit the vehicle to be brought to a stop in the same distance as on a level highway. Equivalent safety is obtained by reducing the vehicle's speed in relation to the steepness of the down grade. Such a means is shown in Fig. 25 and Fig. 26. In Fig. 25 a tape 26' such as used in Fig. 2 passes around roller 115 on the end of lever 116 pivoted at point 117. The other end of lever 116 is kept in contact with the face of cam 118 by spring 119 in tension. Cam 118 is fastened to shaft 119 turning in bearing 119a and 119b. Suspended from shaft 119 are two rods 120a and 120b supporting a weight 121. The housing is filled with oil or a similar viscous liquid 124 to obtain a slight time delay. The middle section of shaft 119 passes thru a stationary liquid tight housing 122. Fastened to shaft 119 within housing 122 may be two vanes 123a and 123b. These vanes have a very small clearance between all faces of the housing 122 and therefore serve as dashpots to restrict the movement of shaft 119. The action of this device in adding to the declassification of the vehicle is as follows: When the vehicle is going down hill the weight 121 moves forward turning with it cam 118 which raises one end of lever 116 and depresses the roller end. This in turn moves tape 26' in such a manner as to cause the safety scale of the speedometer to be declassified. The dashpot action would serve the purpose of stabilizing the movement of the weight and minimizing declassification on very short down grades. The shape of cam 118 can be fixed to regulate the declassification in relation to the steepness of the down grade. By the same token higher speeds should be permitted up hill and the face of cam 118 takes this factor into account. Safety would be promoted without introducing complications by declassifying vehicles according to the steepness of the grade as provided for in Fig. 25 and Fig. 26. It is obvious that while it is generally recognized that vehicle speeds should be lower on down grades than on the level the present speed marker system in use today does not lend itself to such frequent and irregular changes as would be required on streets and highways.

Consideration will now be given to the design of slot 37 of driver's key receptacle 38 (see Fig. 3 and Fig. 10) which was referred to in an earlier part of this specification. In addition to the classification of drivers according to their experience, ability and record, as already provided for in the key system described, it is also proposed to add to these same driver classification keys other classification differentiations which will further promote safety. It is proposed, for instance, that the slot 37 receiving the driver's keys be designed distinctive for each type of vehicle. An example of this proposal is shown in Fig. 13 to Fig. 17 where designs of five different types of key receivers are shown. The first of these, Fig. 13, is labeled for a passenger car, Fig. 14 for a light truck, Fig. 15 for a heavy truck, Fig. 16 for a bus, and Fig. 17 for a taxicab. Each of these key receivers, 38a to 38e inclusive, differ from another in the design of the slot 37a to 37e admitting the driver's key. Under this concept if a person were qualified to operate a passenger car but not a truck, bus or any other type of vehicle then his key (irrespective of his driver's classification) would only fit a passenger car key receiver. An example of such a key is shown in cross section in Fig. 18. It will be noted that this key will only fit into slot 37a of the passenger car. Likewise the driver's key as shown by Fig. 20 will only fit into a single key receiver, that of the heavy truck. The driver in possession of the key shown in Fig. 20 could only use this key in the heavy truck receptacle as shown by Fig. 15. It is, of course, obvious that all manner of combinations may be developed in this connection. A simple combination is shown by the key cross section in Fig. 19. This key is designed to fit either a passenger car or a light truck while the key shown in Fig. 21 fits either a heavy truck, a light truck, or a passenger car. A key such as shown in Fig. 21 would be made available to drivers qualified to operate all these vehicles. The usefulness of different keys for the different types of vehicles will be apparent in considering the status of a driver applying for his first truck driver's license. He might have an excellent record as a passenger car operator and be so qualified by a "0" key, however, his lack of experience would require that he be declassified as a truck driver until a trial period had proven his qualification. He would then at least temporarily have two operator keys, one for driving passenger cars and one for light trucks. If at the end of the trial period he proved his qualification he would receive a combination key such as shown in Fig. 19 in place of the two separate keys. Later should he commit a traffic violation he might be penalized by having his Fig. 19 key exchanged for another of the same type but with one or more declassifications for both passenger car and light truck operation.

Another important use of a key applicable only to a single use such as a bus or truck is the case of where a truck driver or bus operator has committed an infraction of the law when operating a pleasure car and appears before the court for punishment. With the system as described in use, this driver's combination key would be forfeited and if circumstances permitted a new key issued to him permitting him to operate only a truck or bus as the case may be. In this way he could continue to earn his livelihood but would be denied the privilege of using a passenger vehicle.

As many types of speed responsive means and speedometer scales are in use today it is obvious that the particular scale design shown in Fig. 2 and Fig. 22 would not meet all conditions. Many scales in use today, for instance, are straight and not circular. An example is shown in Fig. 29 and Fig. 30 of a straight scale operating on the same basic principle of deration as the circular scale previously described.

Three scales are shown in Fig. 29 and Fig. 30, a fixed true speed scale 115, an elastic safety scale 116, and a fixed declassification scale 117. Pointer 118 actuated by the speed responsive means indicates simultaneously on both scales 115 and 116. In Fig. 29 pointer 118 indicates the same speed on both scales since, as shown by indicator 119, ("0") no declassification is in effect. In Fig. 30 indicator 119 shows that two declassifications are in effect and also pointer 119 indicates a higher speed on the safety scale than on the true scale.

The reading on the safety scale depends upon the tension that is placed upon it. As tension is released it contracts and indicates a higher speed than does the true scale. As in the example of the circular elastic scale the tension is determined by the declassification means. Tape 20a in this case is the same as tape 20 in Fig. 2 and is connected to the safety scale at point 120, the end of scale 116 being fixed at its zero point.

Another style of horizontal scale is shown in Fig. 31 where the safety scale moves vertically relative to the true scale 122 as shown by its dotted position opposite 5 on the declassification scale 123. A common pointer 124 pivoted at 125 indicates speeds on the two scales. Weight 126, connected by cord 127, passing over pulley 128, and connected to scale 121 at point 129, is held in position by tape 130 passing over pulley 131 and over cam 132 connected at point 133. The position of cam 132 in turn is determined by tape 26a passing over pulley 134 directly connected to cam 132 by shaft 135. Tape 26a connects to the same declassification means as does tape 26 in Fig. 2.

Figure 33:
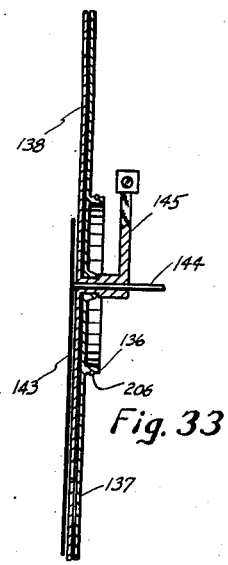
Fig. 33 is an end elevation of Fig. 32.

A circular safety scale also actuated by the same declassification means as previously described is shown in Fig. 32, Fig. 33 and Fig. 34. In this design, tape 20b is positioned by a cam actuated by the declassification means and passes over shoulder 136 of safety scale 137. The true scale is stenciled on the outside face of plate 138 and the safety scale 137 is visible thru slots 139, 140 and 141 in plate 138. The declassification in effect is visible thru hole 142 in plate 138. A common pointer 143 indicates the speed on both scales. Pointer 143 is actuated by shaft 144 which passes thru the fixed member 145 supporting plate 138.

Figure 36:
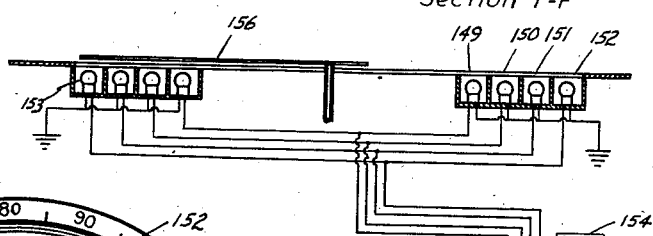
Fig. 36 is a cross section of Fig. 35.
Figure 35:
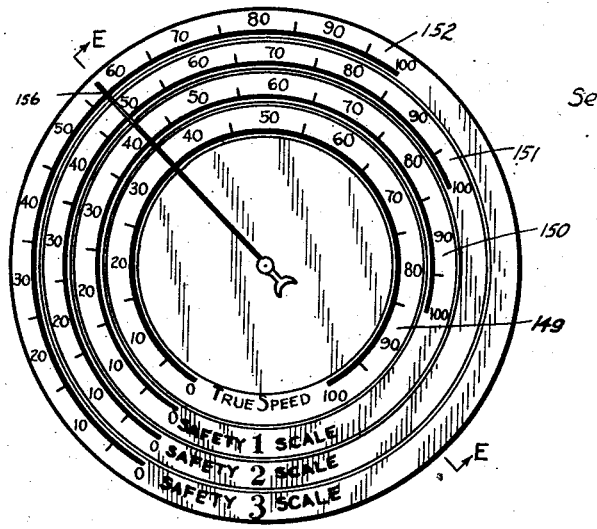
Fig. 35 is a front view of a speed responsive means in which declassification is obtained by selecting the desired scale.

A circular scale design, free of scale moving parts, is shown in Fig. 35 and Fig. 36 in which the rod 146 is actuated by the declassification means and carries a moving contact 147 and 148 on its end. These contacts in turn complete electrical circuits to illuminate selected scales as shown.

A true scale 149 and three safety scales 150, 151, and 152 are shown in the figure. Suitable lamps 153 are placed so as to illuminate the scale selected by moving contact 147. In the example moving contact 146 illuminates No. 1 safety scale which as shown by indicator 155 on scale 154 corresponds to one declassification. The true scale 149 is always illuminated or made otherwise visible while the various safety scales are selected by the declassification means and illuminated selectively one at a time. A common pointer 156 indicates the speeds on all scales. It is of course obvious that more or less than the three safety scales shown may be used.

While this last example and the others have all incorporated the idea of speed reductions in approximate proportion to speed, it is not to be construed that it is mandatory that such relationships be established. An analysis of the whole scheme of traffic safety shows the idea of an approximate proportional reduction in speed to be sound. However, within the usual metropolitan speed ranges allowed, speed reductions of some arbitrary number of miles per hour seem to give fair results, and Fig. 37 and Fig. 38 have been included to bring out this possibility as well as to show that, within certain limitations, simple scale pointer relationship means can accomplish the desired result.

The scale pointer relationship in Fig. 37 consists of a small inner scale 162 and an outer scale 163. These scales are constructed so that one is held stationary and the other capable of being shifted about a common axis. A single pointer indicates the speed on each scale. When the zero mark of both scales corresponds the pointer indicates the same speed on each scale. If, however, the five mile per hour mark of one scale is placed opposite the zero mark of the other then these scale readings differ over the entire scale range—that is, assuming uniform scale division.

In Fig. 37, the inner scale 162 is held stationary and therefore becomes the true scale. The outer scale 163 can be turned about the inner and is as labeled the "Safety scale." The outer edge of safety scale 163 has a groove for tape 160 which in turn is connected to a spring 165 at one end and cam 159 at the other. Cam 159 is fastened to shaft 158 which in turn is fastened to pulley 157 over which declassification tape 266 passes.

As tape 160 moves in response to vehicle declassification the safety scale 163 is turned counterclockwise with indicator 166 showing on declassification scale 161, the declassification of the vehicle. As in previous examples, it is apparent that fractional unit declassification also may be imposed and that successive declassification steps may be uniform or variable as shown. Fig. 38 is a cross section "DD" of Fig. 37 and shows one way in which true scale 162 may be held in a fixed position by structural member 167. Speedometer shaft 168 passed thru bearing 169 and is fastened to pointer 164.

Having thus described my invention, what I claim is:

1. In a vehicular speed responsive device having a speed scale and indicator capable of movement relatively to each other normally to indicate actual speed of a vehicle equipped therewith, means capable of adjusting said scale and indicator relationship in recognition of a condition rendering reduced speed advisable for safety, whereby a scale speed proportionate to the reduction in safety occasioned by said condition will be indicated, and for operating said first-mentioned means and controllable remotely from the vehicle carrying said device, whereby authoritative control of said first-mentioned means by others than the driver may be established.

2. In a vehicular speed responsive device having a speed scale and indicator moving relatively to each other to indicate normal actual speed of a vehicle equipped therewith, a flexible element associated with said device and arranged in substantially circuitous manner to produce a series of portions and capable of establishing relatively different adjusted relationships of scale and indicator, and a separate means operable in each portion and capable of establishing relatively different lengths of portions whereby cumulatively the effective length of the element will be altered as said portion lengths are varied, each of said means being useable in recognizing a condition rendering reduced speed advisable and whereby a relationship of scale and indicator is established proportionate to the reduction in safety occasioned by conditions which have been recognized as evidenced by operation of each of said means.

3. In a vehicular speed responsive device having speed scale and indicator members moving relatively to each other to indicate normal actual speed of a vehicle equipped therewith, a flexible element composed of portions to produce cumulative results and associated with one of said device member, and a separate means operable on each of said portions and capable of establishing relatively different conditions of said element, each of said separate means being useable in recognizing a condition rendering reduced speed advisable and whereby a relationship of scale and indicator is established proportionate to the reduction in safety occasioned by conditions which have been recognized as evidenced by operation of each of said separate means.

4. In a vehicular speed responsive device having speed scale and indicator members moving relatively to each other, said scale consisting of parts capable of relative alteration whereby they lie in different relationships to each other and the indicator, a flexible element composed of portions to produce cumulative results and associated with said scale parts, a separate means operable on each of said portions of the element and capable thereby of effecting relative alteration of the scale parts in observance of each condition which renders reduction in speed advisable, whereby each alteration operates cumulatively on said scale parts to effect cumulative scale parts displacement, and whereby a relationship of scale parts and indicator is established proportionate to the safety reduction occasioned by conditions which rendered operation of each of said separate means advisable.

5. In a vehicular speed responsive device having speed scale and indicator members moving relatively to each other, said scale consisting of two parts capable of relative alteration, one part to disclose actual speed and the other part to disclose safety speed, whereby they lie in different relationships to each other and the indicator, a flexible element composed of portions to produce cumulative results and associated with said scale parts, a separate means operable on each of said portions of the element and capable thereby of effecting alteration of the safety speed scale part in observance of each condition which renders reduction in speed advisable, whereby each alteration operates cumulatively on said safety speed scale part to effect cumulative safety speed scale part displacement relatively to the actual speed scale part, and whereby a relationship of scale parts and indicator is established continuously proportionate to the safety reduction occasioned by conditions which rendered operation of each of said separate means advisable.

LESTER L. BOSCH.